United States Patent [19]

Jeong

[11] Patent Number: 5,034,918
[45] Date of Patent: Jul. 23, 1991

[54] ADAPTIVE ASSOCIATIVE MEMORY COMPRISING SYNAPES OF CMOS TRANSISTORS

[75] Inventor: Ho-sun Jeong, Taegu, Rep. of Korea

[73] Assignee: Samsung Electronics Co., Ltd., Rep. of Korea

[21] Appl. No.: 473,465

[22] Filed: Feb. 1, 1990

[30] Foreign Application Priority Data

Feb. 2, 1989 [KR] Rep. of Korea .................. 89-1370

[51] Int. Cl.$^5$ .................. G11C 15/00; G06G 7/00; G09C 00/00; H03K 19/08
[52] U.S. Cl. .................................. 365/49; 364/807; 364/513; 307/201
[58] Field of Search ............. 364/807, 513; 365/49; 307/201, 202, 570, 584

[56] References Cited

U.S. PATENT DOCUMENTS

| | | | |
|---|---|---|---|
| 4,719,591 | 1/1988 | Hopfield et al. | 364/807 |
| 4,782,460 | 11/1988 | Spencer | 364/807 |
| 4,807,168 | 2/1989 | Moopenn et al. | 364/807 |
| 4,901,271 | 2/1990 | Graf | 364/807 |
| 4,903,226 | 2/1990 | Tsividis | 364/807 |
| 4,956,564 | 9/1990 | Holler et al. | 307/201 |
| 4,962,342 | 10/1990 | Mead et al. | 307/201 |

OTHER PUBLICATIONS

H. P. Graf et al., "VSLI Implementation of a Neural Network Model", *IEEE Computer*, vol. 21, Mar. 1988, pp.

Daud et al., "Neural Network Based on Feed-Forward High Density Associative Memory", *Digest of Int'l Electron Devices Meeting*, Dec. 1987, pp. 107-110.

*Primary Examiner*—Joseph A. Popek
*Assistant Examiner*—Michael A. Whitfield
*Attorney, Agent, or Firm*—Cushman, Darby & Cushman

[57] ABSTRACT

An associative memory for storing an n-bit stored vector in m different states comprises n first amplifiers connected between n input terminals and n output terminals, and m second amplifiers to feedback to the input side the designated states of the stored vectors. Synapses of the storing unit store the above mentioned stored vectors in the a binary 1 or 0; synapses of the label units couple the respective intersections between the input and output lines of the second amplifiers; and synapses of the vector units couple the intersections between the output lines of the first amplifiers and the input lines of the second amplifiers. According to the present invention, the outputs of the amplifiers are stabilized, so that stabilized operations can be obtained.

5 Claims, 2 Drawing Sheets

ADAPTIVE ASSOCIATIVE MEMORY COMPRISING SYNAPES OF CMOS TRANSISTORS

FIELD OF THE INVENTION

The present invention relates to an associative memory, and particularly to an associative memory utilizing a neural network.

BACKGROUND OF THE INVENTION

Computer memories can be divided into two kinds based on the method of designating the contents. The first kind of memory which is seen in the existing computers, is the method of reading out the stored data from the respective addresses after establishing a series of addresses for finding the target items. In such a case, even if a certain information is stored at a certain address, if the address is unknown, the information cannot be inputted or outputted to and from the address. That is, only method of accessing to the information is to know the certain address.

The other kind of memory which is similar with the human memory, functions in such a manner that a large quantity of information is found out by means of a small amount of information. Thus, the memory device in which the stored data is found out by means of data contents is called an associative memory, and is also called a content addressable memory (CAM), because the designation is made by means of the contents.

In such a method, the designations of addresses are not required, and data can be stored in the form of certain symbols instead of using numerals, with the result that combinations of infinite patterns are possible. Such an associative memory is based on the neural network model, and is applicable to the fields of the image recognition and the pattern recognition.

In 1988, the Bell Laboratory of the AT & T Company disclosed the possibility of formation of a VLSI based on a neural network model through the use of the associative memory of FIG. 2 and the pattern classifier of FIG. 1. (H. P. Graf, L. D. Jackel, and W. E. Hubbard; VLSI Implementation of a Neural Network Model, IEEE Trans. Computers; PP. 41-49, March 1988).

In FIG. 1, the pattern classifier includes an amplifier which consists of a label unit and a vector unit. Several vectors are stored in the circuit, and each of the vectors is connected to the input line of a label unit. The element of the vectors stored can have a value of $-1$ or $+1$, and an excitatory connection is marked by a value of $+1$, while an inhibitory connection is marked by $-1$. The input vector is provided by inputting vector units, and the elements of the input vector can have a value of 1 or 0. Each time a value of $+1$ is added to the input vector, the current is increased or decreased to the input line of the label unit, depending on the connection pattern. In this circuit, a stable state is formed when the total current flowing through the input line of the label unit becomes 0. If the input voltage exceeds the threshold value of the amplifier, then the output of the label unit will have a high state, while, otherwise, the output will be kept at a low state. The output of the label unit is governed by Formula (1) as specified below.

$$\sum_{i=0}^{i=N} \frac{\delta_1 \cdot \mu_1}{Ri} \begin{cases} > 0: Vout = \text{"High"} \\ < 0: Vout = \text{"Low"} \end{cases} \quad (1)$$

where $\delta_1$ indicates the element of the input vector $(+1,0)$, $\mu_1$ indicates the element of the stored vector $(-1,0,+1)$, and Ri indicates the connection resistance $(R-,R+)$.

The input vectors are compared with the stored vectors in a parallel form, and thus, an inner product between the input vector and the stored vector is produced. The outputs of the label units corresponding to all the stored vectors which approximately resemble the input vector will have a high state. If the input vector has a value of $+1$ at the position where the stored vector has a positive value, then the sum of the inner product is increased, whereas, if the input vector has a value of $+1$ at the position where the stored vector has a value of $-1$, the sum of the inner product is decreased.

In this circuit, if the value of the connection resistance R is made to be larger than the value of the connection resistance R+, then the inner product of the mismatch state, in which an input value of $+1$ is fed to the position of a stored vector having $-1$, becomes larger than the inner product of a match state.

Accordingly, if an input value of 1 is added to the position where the stored vector has a value of $-1$, it can be seen that the input vector is mismatching to the stored vector. Then there arises the problem that the label unit outputs a match state regardless of the stored vector. That is, as shown in FIG. 1, if it is assumed that the stored vectors hold the values of $(-1,+1,0,+1)$ and $(+1,+1,-1,+1)$, and in this state, if $(0,+1,0,0)$ are inputted, the two label units will output a high state which is a match state.

The associative memory of FIG. 2 is constituted such that an inhibitory connection $-1$ is added between the label units in the pattern classifier of FIG. 1, and that the outputs of the label units are connected to the input lines of the vector units, with the result that it holds the above described disadvantages.

SUMMARY OF THE INVENTION

Therefore, it is an object of the present invention to provide an improved associative memory using CMOS transistors in order to overcome the above described disadvantages of the conventional techniques.

It is another object of the present invention to provide an associative memory in which the VLSI formation is facilitated by using MOS transistors as the synapse.

In achieving the above objects, the associative memory of the present invention for storing n-bit stored vectors in m different states, comprises:

first amplifiers in the number of n, respectively connected between n input terminals and n output terminals;

second amplifiers in the number of m, for feeding back to the input side the designated states of the stored vectors stored in m different states, in accordance with the input states supplied to the n input terminals;

synapse groups of the storing units for storing the above-mentioned stored vectors in the value of binary 1 or 0 in accordance with the existence or absence of the coupling of the intersections between the output lines of the first amplifiers and the input lines of the second amplifiers;

synapse groups of the label units for coupling the respective intersections between the input and output lines of the second amplifiers except the intersecting sections between the input and output lines of itself; and synapse groups of the vector units for coupling the intersecting sections between the output lines of the first amplifiers and the input lines of the second amplifiers.

Here, each of the synapses of the respective units consists of either a PMOS transistor or an NMOS transistor.

BRIEF DESCRIPTION OF THE DRAWINGS

The above objects and other advantages of the present invention will become more apparent by describing in detail the preferred embodiment of the present invention with reference to the attached drawings in which.

DESCRIPTION OF THE PREFERRED EMBODIMENT

Figure 1:
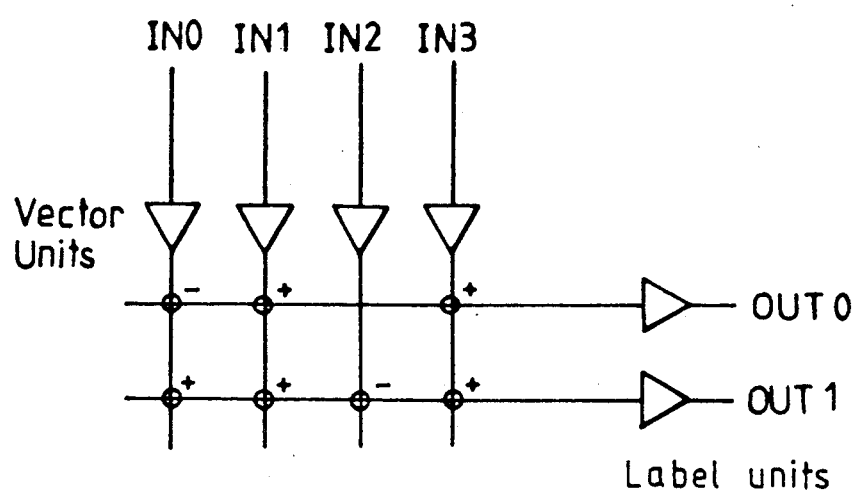
FIG. 1 is a conventional pattern classifier using a neural network.
Figure 2:
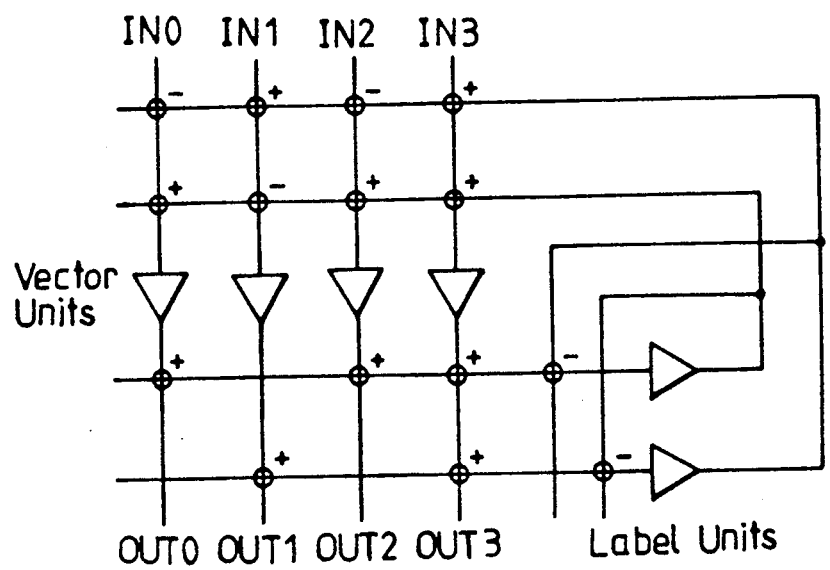
FIG. 2 illustrates the constitution of the conventional associative memory using a neural network.
Figure 3:
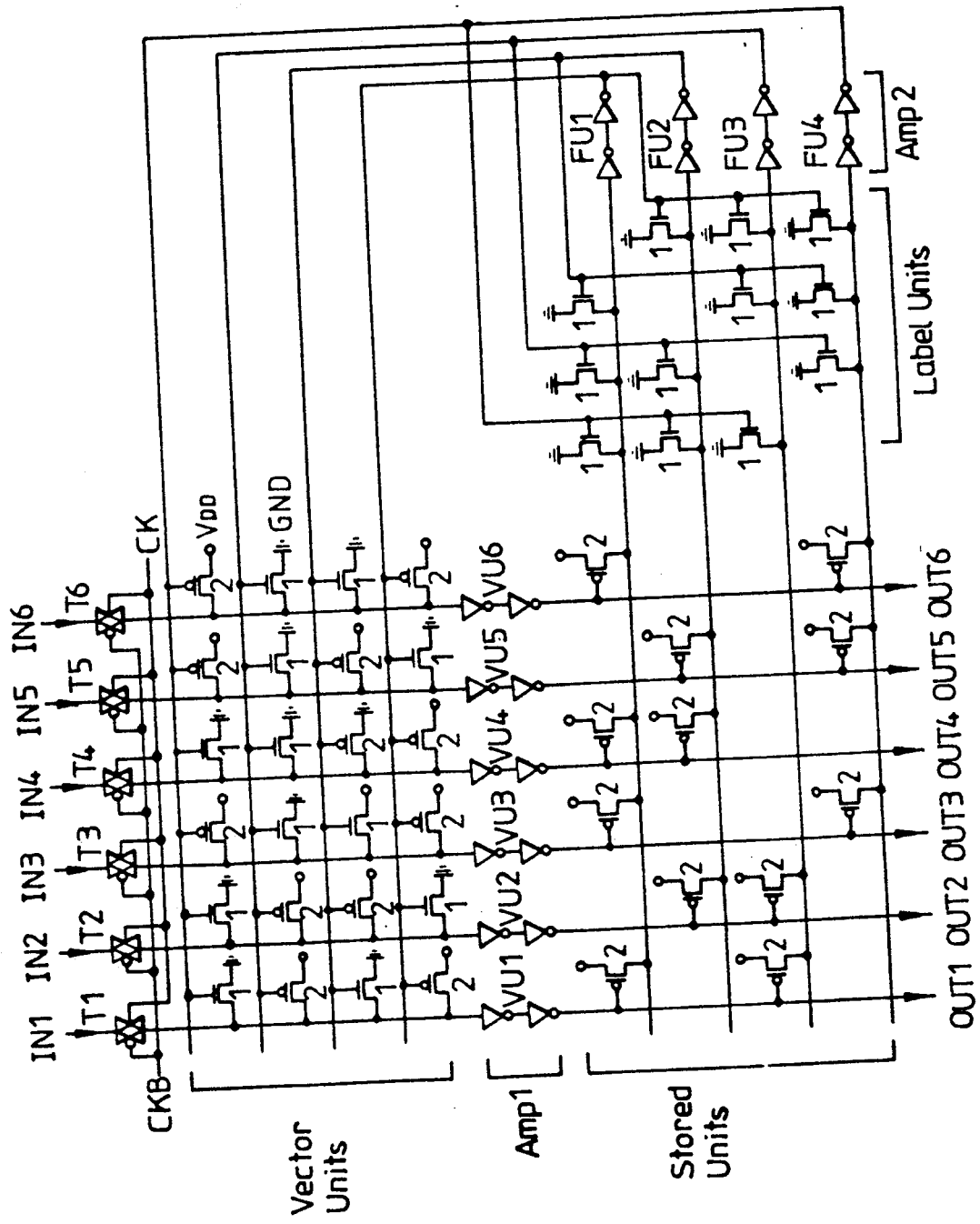
FIG. 3 illustrates the preferred embodiment of the associative memory using the unidirectional feedback type (UFT) network according to the present invention.

FIG. 3 is a circuital illustration of the preferred embodiment of the associative memory for storing 6-bit stored vectors in four different states according to the present invention.

The associative memory circuit of FIG. 3 comprises: first amplifiers VU1-VU6 for receiving 6-bit input vectors; second amplifiers FU1-FU4 for feeding back to the input side the designated states of the stored vectors stored in four different states; synapse groups of storing units for storing the stored vectors in the value of binary 1 or 0 in accordance with the existence or absence of the couplings of the intersecting sections between the output lines of the first amplifiers and the input lines of the second amplifiers; synapse groups of label units for coupling the intersecting sections between the second amplifiers except the intersecting sections between the input and output lines of itself; and synapse groups of vector units for coupling the intersecting sections between the output lines of the first amplifiers and the input lines of the second amplifiers. Also, the input lines of the first amplifiers VU1~VU6 have respective transmission gates T1~T6 for controlling the input vectors.

The first amplifiers VU1-VU6 are respectively connected between the input terminals In1-In6 and the output terminals OUT1-OUT6. The second amplifiers FU1-FU4 which have output lines intersecting with the input lines of the first amplifiers VU1-VU6 have label unit portions in which their input and output lines cross to one another.

The first and second amplifiers are buffer-amplifiers which consist of two serially connected CMOS inverters respectively. The intersecting sections between the output lines of the first amplifiers and the input lines of the second amplifiers form storing units, and if the stored vector is a binary 1, a PMOS transistor is connected, while, if the stored vector is a binary 0, no element is connected.

Accordingly, the 6-bit stored vectors stored in the storing units of FIG. 3 memorizes four different states: 101101, 010110, 110000 and 001011. These different states of the 6-bit stored vectors maintain respectively a bit distance of $Dt \geq 2t+1$ based on the Hamming's law for the correction of errors, where t indicates the number of the bits to be corrected, and Dt indicates the number of the checked bits. Thus, if an error for only one bit is to be corrected, at least bit pairs of 3 bits or more have to be given. For example, in the first state (101101) and the second state (010110) of FIG. 3, all the bit pairs except the fourth bits are different each other.

The synapses of the label units consist of NMOS transistors having the reference geometrical aspect ratio W/L which is equivalent to the conductance value of 1. The geometrical aspect ratio W/L which is ratio of the channel width W to the channel length L of the MOS transistor, specifies the conductance value. The outputs of the second amplifiers FU1-FU4 are fed back to the gate of an NMOS transistor coupled to the input line of the other second amplifiers.

The respective PMOS transistors of the storing units have a conductance value of one less than the total sum of the conductance values of the NMOS transistors of the label units connected to the respective input lines of the second amplifiers FU1-FU4. Here, the conductance value of the NMOS transistor is made to be 1 by adjusting the reference geometrical aspect ratio W/L of the MOS transistor. Therefore, the PMOS transistors of the storing units have a conductance value of 2 which is one less than the sum of the conductance values of the NMOS transistors $(1+1+1=3)$.

The intersecting portions between the input lines of the first amplifiers VU1-VU6 and the output lines of the second amplifiers FU1-FU4 form vector units. The synapses of these vector units respectively consist of PMOS transistors at the positions corresponding to the PMOS transistors of the storing units, and NMOS transistors at the other intersecting portions.

The conductance value of the NMOS transistor of the vector unit is 1, while the conductance value of the PMOS transistors has a value equivalent to the number of the NMOS transistors which are disposed in the same vertical column as the PMOS transistor. In this embodiment, there are two NMOS transistors in each vertical column and hence the PMOS transistors have a conductive value of 2. The source electrodes of all the NMOS transistors receive a second power source voltage (ground), while the source electrodes of the PMOS transistors receive a first power source voltage VDD. Further, if the total sum of the conductance values of the PMOS and NMOS transistors are the same, the conductance values are such that the PMOS transistor should prevail.

The present invention constituted as described above will have an action and effect as described below.

First, if an input vector which is the same as any one of the four states of the memorized 6-bit stored vectors is inputted (for example, if 110000 is inputted), this inputted vector will be supplied through the first amplifiers to the stored unit to be ultimately arrived at the output terminals OUT1-OUT6. Under this condition, the PMOS transistors connected to the first and second bit lines of the storing unit are kept in a turned-off state, while the PMOS transistors connected to the third to sixth bit lines are turned on, with the result that the first power source voltage VDD is supplied to the input lines of the second amplifiers FU1, FU2, FU4. Consequently, the outputs of all the amplifiers, except the second amplifier FU3, are shifted to a high state, and therefore, all the NMOS transistors are turned on except the NMOS transistor connected to the second vertical column of the label units i.e. the NMOS transistors having gates connected to the output of second amplifier FU). The respective input lines of the second amplifiers should have PMOS:NMOS conductance ratios of 6:2, 4:2, 0:3 and 6:2thereby initially stabilizing the outputting state.

These stabilized outputs of the second amplifiers are supplied to the vector units, and consequently, the input lines of the first amplifiers will have PMOS:NMOS conductance ratios of 2:2, 2:2, 0:1, 0:1, 0:1 and 0:1. Accordingly, the input state of the first amplifiers is stabilized and settled to an input vector which is same as 110000 supplied to the input terminals.

If an input vector of 111000 is supplied to the input terminal, then the PMOS transistors connected to the first to third bit lines of the stored unit will be turned off, and the rest of the PMOS transistors will be turned on. Therefore, the first power source voltage VDD will be supplied to the input lines of all second amplifiers, except the second amplifier FU3, and all the NMOS transistors are turned on except the NMOS transtors of the second vertical column of the label units (i.e. the NMOS transistors having gates connected to the output of second amplifier FU3).

Accordingly, the input lines of the second amplifiers FU1-FU4 will have PMOS:NMOS conductance ratios of 4:2, 4:2, 0:3 and 4:2, and the outputting state will be initially stabilized thereupon. These stabilized outputs of the second amplifiers will be supplied to the vector units, and therefore, in the same way as the input vector of 110000 is supplied, the respective input lines of the first amplifiers will have the conductance ratios. Accordingly, the last input vector 111000 will be outputted after being corrected to 110000.

If an input vector 100000 is supplied, then the first power source voltage VDD will be supplied to all the input lines of the second amplifiers, and therefore, all the NMOS transistors of the label unit will be turned on, with the result that the PMOS:NMOS conductance ratios of the input lines of the second amplifiers become 6:3, 6:3, 2:3, and 6:3, and that the outputs of the second amplifiers FU1-FU4 are corrected to 1101. Accordingly, a state of 1101 is fed back to the vector unit, so that the input lines of the first amplifiers VU1-VU6 should have conductance ratios as described above, and that a stored vector 110000 is outputted to the output terminals OUT1-OUT6 after being corrected of the errors.

According to the present invention as described above, the input vectors approach similar stored vectors, and the synapses of the respective units consist of PMOS and NMOS transistors so as for the outputs of the amplifiers to be stabilized, thereby obtaining stabilized operations.

In the above, the descriptions were made only for the case where a 6-bit stored vector is memorized into a circuit in four different states, but it should be understood that a further expansion is possible within the scope of the attached claims.

What is claimed is:

1. An associative memory comprising:
   n first input lines for receiving an n-bit input vector;
   n first amplifiers for amplifying each bit of the n-bit input vector, said in first amplifiers corresponding to ones of said in first input lines;
   n first output lines for corresponding ones of said n first amplifiers;
   m second amplifiers;
   m second input lines for corresponding ones of said m second amplifiers, said m second input lines forming first intersections with said n first output lines;
   m n-bit stored vectors formed at said first intersection;
   storing unit synapses of a plurality of PMOS transistors disposed at predetermined ones of said first intersections corresponding to binary components "1" of the m n-bit stored vectors, said plurality PMOS transistors having predetermined conductance values and coupling a first power source voltage to said m second input lines in accordance with an output of said n first amplifiers on said n first output lines;
   m second output lines for corresponding ones of said second amplifiers, said m second output lines forming second intersections with said second input lines;
   label unit synapses of a plurality of NMOS transistors disposed at predetermined ones of said second intersections, whereby the output of one of said m second amplifiers is operatively fedback to each of said n first input lines corresponding to the other of said m second amplifiers; said plurality of NMOS transistors having a conductance value of "1" and coupling a second power source voltage to said second input lines in accordance with outputs of said m second amplifiers on said m second output lines;
   said conductance values of respective said ones of plurality of PMOS transistors of said storing unit synapses being one less than the sum of the conductance values of said plurality of NMOS transistors of said label unit synapses coupled to the corresponding ones of said m second input lines;
   said m second output lines of said m second amplifiers forming third intersections with said n first input lines of said n first amplifiers;
   vector unit synapses having a plurality of NMOS transistors and PMOS transistors, said plurality of PMOS transistors being disposed at predetermined ones of said third intersections corresponding to said first intersections wherein said plurality of PMOS transistors of said storing unit synapses are disposed; said plurality of NMOS transistors being disposed at the other of said third intersections and having a conductance value of "1" , said plurality of NMOS transistors coupling the second power source voltage to said n first input lines of said n first amplifiers in accordance with the outputs of said m second amplifiers on said m second output lines; and
   said plurality of PMOS transistors of said vector unit synapses having conductance values equal to the number of NMOS transistors coupled to the corresponding ones of said n first input lines, said plurality of PMOS transistors coupling the first power source voltage to said n first input lines of said n first amplifiers in accordance with the outputs of said m second amplifiers on said m second output lines.

2. An associative memory as claimed in claim 1, wherein the m n-bit stored vectors maintain a bit distance of $Dt \geq 2t+1$, where t represents a number of bits to be corrected, and Dt represents a number of checked bits.

3. An associative memory as claimed in claim 1, wherein each of said n first and m second amplifiers comprises two serially connected CMOS inverters.

4. An associative memory as claimed in claim 1, wherein said associative memory further comprises n transmitting gates for transmitting said n-bit input vector to said n first input lines of said n first amplifiers in response to a clock signal.

5. An associative memory as claimed in claim 1, wherein said first power source voltage is a supply voltage VDD and said second power source voltage is a ground potential GND.

* * * * *